United States Patent

Shimizu et al.

[11] 4,349,608
[45] Sep. 14, 1982

[54] MAGNETIC RECORDING MEDIUM

[75] Inventors: Jozo Shimizu, Nagaoka; Satoru Yamaguchi, Suita; Shigeo Aoyama, Ibaraki, all of Japan

[73] Assignee: Hitachi Maxell, Ltd., Osaka, Japan

[21] Appl. No.: 294,220

[22] Filed: Aug. 19, 1981

[30] Foreign Application Priority Data

Aug. 20, 1980 [JP] Japan ................... 55-115038
Aug. 20, 1980 [JP] Japan ................... 55-115040
Aug. 20, 1980 [JP] Japan ................... 55-115041
Aug. 20, 1980 [JP] Japan ................... 55-115042

[51] Int. Cl.$^3$ ................ B32B 27/38; B32B 9/04; H01F 10/02
[52] U.S. Cl. ................... 428/413; 428/447; 428/522; 428/532; 428/695; 428/900
[58] Field of Search ............ 428/447, 522, 413, 532, 428/695, 900

[56] References Cited

U.S. PATENT DOCUMENTS 4,171,406 10/1979 Yamaguchi et al. ........... 428/900 X

Primary Examiner—Bernard D. Pianalto
Attorney, Agent, or Firm—Birch, Stewart, Kolasch & Birch

[57] ABSTRACT

A magnetic recording medium improved in lubricity and abrasion resistance, which comprises a base material and a magnetic layer provided thereon, said magnetic layer comprising magnetic particles and a binder, characterized in that said magnetic layer further comprises at least one silicone compound of the formula:

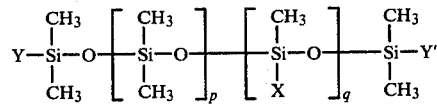

wherein X is the same or different and —A—COOH, —A—OH,

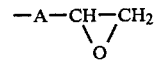

or —A—NH$_2$ in which A is a divalent hydrocarbon group having not more than 26 carbon atoms, Y and Y' are each —X or —CH$_3$, p is an integer of 0 to 1,000 and q is an integer of 1 to 500 but p+q is not more than 1,000 in an amount of 0.1 to 5% by weight based on the weight of the magnetic particles in the magnetic layer.

3 Claims, No Drawings

MAGNETIC RECORDING MEDIUM

The present invention relates to a magnetic recording medium. More particularly, it relates to a magnetic recording medium improved in lubricity and abrasion resistance at the magnetic layer.

A magnetic recording medium such as a magnetic recording tape, which is prepared by applying a magnetic coating composition comprising magnetic particles, a binder and an organic solvent onto the surface of a base material (e.g. polyester film), travels slidably on a magnetic recording head, a guide part and the like during recording and reproducing and therefore its magnetic layer is apt to be abraded. Because of this reason, the magnetic layer of a magnetic recording medium is desired to be small in coefficient of friction and excellent in running stability. Also, it is required to have high abrasion resistance with good durability.

In order to improve the lubricity and abrasion resistance of the magnetic layer, it has been proposed to incorporate a lubricating agent into the magnetic layer. A typical example of the lubricating agent is silicone oil. Silicone oil is quite excellent in lubricity but inferior in compatibility with a binder. Thus, the friction resistance of the magnetic layer can be sufficiently decreased by incorporation of silicone oil therein, but the magnetic layer is apt to become uneven whereby pinholes are produced. Further, bleeding of silicone oil to the surface of the magnetic layer is frequently observed.

For improvement of the compatibility, it was proposed to use a modified silicone compound of the following formula [U.S. Pat. No. 4,135,016]:

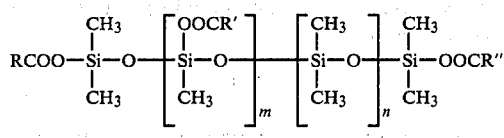

wherein R, R' and R" are each a hydrocarbon group having 7 to 21 carbon atoms, and m and n are each an appropriate integer. The modified silicone compound can afford a magnetic recording medium, such as a magnetic recording tape, excellent in lubricity and durability. However, after storage over a long period of time, the lubricity is gradually lost, and the running during reproduction becomes unstable. These defects are probably caused by gradual hydrolysis of the modified silicone compound with the moisture present in the air. Since hydrolysis of the modified silicone compound takes place already in the magnetic recording composition before application, its incorporation produces the gelation of the magnetic coating composition and lowers the dispersibility of the magnetic coating composition. Thus, the magnetic layer wherein magnetic particles are evenly dispersed and which shows a high sensitivity is hardly obtainable. Because of this reason, the incorporation of the modified silicone compound into the magnetic layer is desirably achieved by spraying a dispersion comprising the modified silicone compound onto the surface of the magnetic layer or by dipping the surface of the magnetic layer into the said dispersion. The thus obtained magnetic recording medium has the modified silicone compound in a concentrated state at the surface of the magnetic layer. Therefore, it shows excellent lubricity at the initial stage of running for reproduction but, since the modified silicone compound is transferred to the recording head or the roller as the result of running under the sliding contact, said lubricity cannot be maintained over a long period of time.

As a result of an extensive study, it has now been found that a certain silicone compound can be uniformly dispersed into a magnetic coating composition without prevention of the even and stable dispersion of magnetic particles and a binder therein while assuring excellent lubricity and durability for a magnetic recording medium having a magnetic layer comprising the same over a long period of time.

According to the present invention, there is provided a magnetic recording medium comprising a base material and a magnetic layer containing magnetic particles and a binder, characterized in that the magnetic layer further contains at least one silicone compound of the formula:

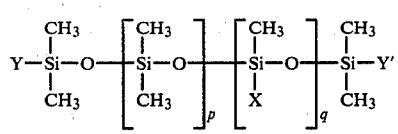

wherein X is the same or different and —A—COOH, —A—OH,

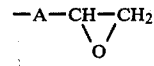

or —A—NH$_2$ (in which A is a divalent hydrocarbon group having not more than 26 carbon atoms), Y and Y' are each —X or —CH$_3$, p is an integer of 0 to 1,000 and q is an integer of 1 to 500 but p+q is not more than 1,000.

The characteristic feature of the invention resides in inclusion of the silicone compound (I) in the magnetic layer of a magnetic recording medium. By the presence of the silicone compound (I), the magnetic layer shows good lubricity and high abrasion resistance, and such good lubricity and high abrasion resistance can be maintained over a long period of time without any material deterioration. Advantageously, the dispersibility of various components in a magnetic coating composition for formation of a magnetic layer is not materially influenced by the presence of the silicone compound (I) therein. In addition, the silicone compound (I) is well compatible with a binder in a magnetic coating composition. Therefore, neither bleeding nor pinholes are produced on the magnetic layer formed by the use of the magnetic coating composition comprising the same.

The silicone compound (I) is known and per se available on the commercial market. In the formula (I), the hydrocarbon group represented by A may be saturated or unsaturated and has not more than 26 carbon atoms. When the number of carbon atoms exceeds 26, the lubricity is rather lowered. When the symbol A is not present, the improvement of abrasion resistance is insufficient. Specific examples of the substituent of the formula: —A—X are as follows:

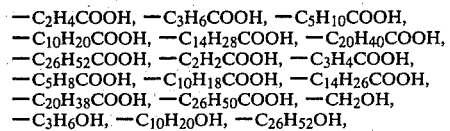

-continued

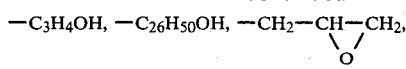

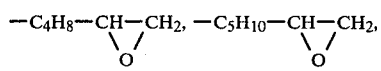

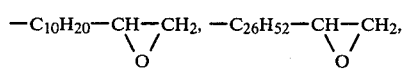

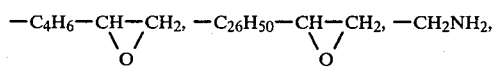

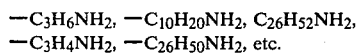

$-C_3H_6NH_2$, $-C_{10}H_{20}NH_2$, $C_{26}H_{52}NH_2$,
$-C_3H_4NH_2$, $-C_{26}H_{50}NH_2$, etc.

Y and Y' may be each $-CH_3$ or $-X$, and at least one of them is preferred to be $-X$, because a better compatibility with the binder is assured and higher lubricity and abrasion resistance are realized. Usually, p and q satisfy the following relationships: $0 \leq p \leq 1,000$; $1 \leq q \leq 500$; $p+q \leq 1,000$. When p and q are too large, the silicone compound (I) becomes hardly soluble in organic solvents, and the preparation of a magnetic coating composition containing the silicone compound (I) as evenly dispersed may be difficult.

One or more kinds of the silicone compound (I) may be used. The amount of the silicone compound (I) to be incorporated into the magnetic layer may be usually from 0.1 to 10% by weight, preferably from 0.1 to 5% by weight, based on the weight of the magnetic particles in the magnetic layer. When the amount is smaller than 0.1% by weight, the improving effect is not materially produced. When larger than 10% by weight, the recording head is stained whereby the output may be lowered.

In order to make a magnetic layer comprising the silicone compound (I), it may be blended with magnetic particles, a binder and an organic solvent, followed by application of the resulting magnetic coating composition onto the surface of a base material such as an elastic sheet (e.g. polyester film) to form a magnetic layer. The content of the silicone compound (I) in the magnetic coating composition may be from 0.1 to 5% by weight, preferably from 0.1 to 3% by weight, based on the weight of the magnetic particles. When the content is more than 5% by weight, the dispersibility of the magnetic particles will become inferior. Naturally, the amount of the silicone compound (I) in the magnetic layer is limited to be from 0.1 to 5% by weight based on the weight of the magnetic particles, when the magnetic layer is formed by the use of the above magnetic coating composition.

Alternatively, the silicone compound (I) may be dispersed in an organic solvent, followed by application of the resulting dispersion onto the surface of a magnetic layer as previously formed on a base material. In this case, the content of the silicone compound (I) in the dispersion may be optional so that its use can provide a magnetic layer containing the silicone compound (I) in an amount of even more than 5% by weight based on the weight of the magnetic particles. As stated above, however, the amount of the silicone compound (I) in the magnetic layer is usually kept at not more than 10% by weight based on the weight of the magnetic particles in order to avoid the lowering of the output.

The application may be effected by a conventional procedure such as brushing, spraying or dipping. The thickness of the magnetic layer thus formed may be usually from 1 to 20μ (after drying) depending upon the thickness of the elastic film, which is ordinarily from 3 to 100μ. In the magnetic layer, the weight proportion of the magnetic particles and the binder is usually from 50:50 to 90:10.

Examples of the magnetic particles are $\gamma$-$Fe_2O_3$ particles, $Fe_3O_4$ particles, Co-containing $\gamma$-$Fe_2O_3$ particles, Co-containing $Fe_3O_4$ particles, $CrO_2$ particles, Fe particles, Co particles, Fe-Ni particles, etc. As the binder, there may be used, for instance, vinyl chloride/vinyl acetate resin, vinylidene chloride resin, acrylonitrile/butadiene resin, vinyl butyral resin, urethane resin, cellulose resin, isocyanate compounds or the like. Among them, the use of vinyl chloride/vinyl acetate resin, cellulose resin, etc. is preferred. No particular limitation is present on the organic solvent, and there may be used one or more chosen from ketones (e.g. acetone, methyl isobutyl ketone, methyl ethyl ketone, cyclohexanone), esters (e.g. ethyl acetate, butyl acetate), aromatic hydrocarbons (e.g. benzene, toluene, xylene), alcohols (e.g. isopropyl alcohol), acid amines (e.g. dimethylformamide), ethers (e.g. tetrahydrofuran, dioxane), etc.

Practical and presently preferred embodiments of the invention are illustratively shown in the following Examples and Reference Example wherein part(s) and % are by weight.

EXAMPLE 1

| Materials | Part(s) |
|---|---|
| Co-containing $\gamma$-$Fe_2O_3$ magnetic particles | 80 |
| Vinyl chloride/vinyl acetate/ vinyl alcohol copolymer ("VAGH" manufactured by Union Carbide Corp.) | 10 |
| Urethane elastomer ("Pandex T-5250" manufactured by Dainippon Ink K.K.) | 8 |
| Trifunctional low molecular isocyanate compound ("Colonate L" manufactured by Nippon Polyurethane Kogyo K.K.) | 2 |
| Cyclohexanone | 50 |
| Methyl ethyl ketone | 50 |
| Silicone compound (I) (Nos. 1 to 11) | 1 |

The above materials were mixed together in a ball mill for 70 hours to make a magnetic coating composition. The composition was applied onto a polyester film of 11μ in thickness, followed by drying to make a coating layer of 5μ in thickness. The resulting film was calendered at the surface and slitted in a width of 3.8 mm to obtain a magnetic recording tape (Specimen Nos. 1-1 to 1-11).

The silicone compound (I) used in this Example was chosen from the following ones:

| No. | Chemical Structure |
|---|---|
| 1 | 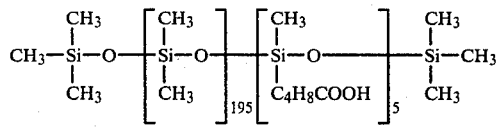 |
| 2 | 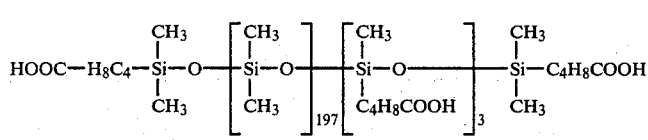 |
| 3 | 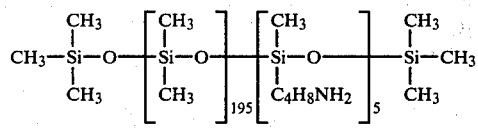 |
| 4 | 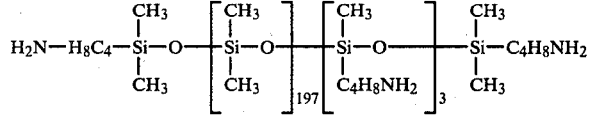 |
| 5 | 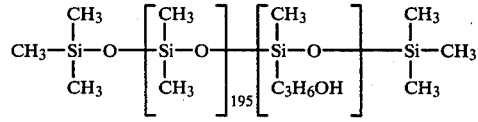 |
| 6 | 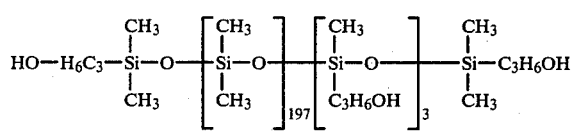 |
| 7 | 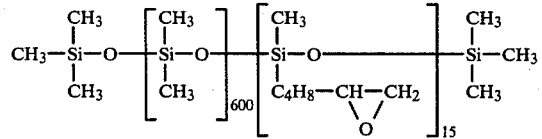 |
| 8 | 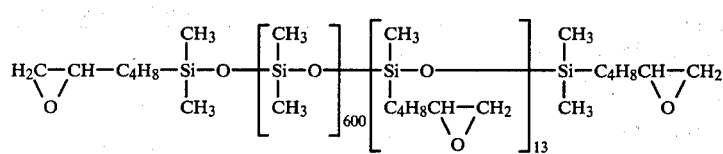 |
| 9 | 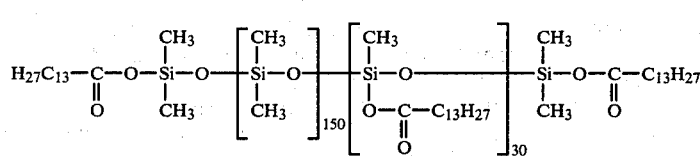 |
| 10 | 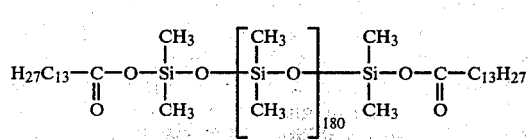 |

| No. | Chemical Structure |
|---|---|
| 11 | 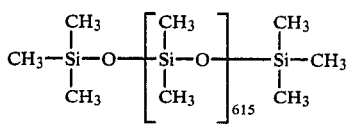 |

EXAMPLE 2

In the same manner as in Example 1 but using nitrocellulose ("Nitrocellulose H ½" manufactured by Asahi Chemical Industry Co., Ltd.) in place of "VAGH", a magnetic recording tape was prepared (Specimen Nos. 2-1 to 2-11).

EXAMPLE 3

In the same manner as in Example 1 but omitting the use of "VAGH" and using 18 parts of "Pandex T-5250" in place of 8 parts of the same, a magnetic recording tape was prepared (Specimen Nos. 3-1 to 3-11).

REFERENCE EXAMPLE

In the same manner as in Example 1 but using 0.07 part of the silicone compound (I) (No. 1) in place of 1 part of the same, a magnetic recording tape was prepared (Specimen No. R-1).

In the same manner as in Example 1 but not using the silicone compound (I), a magnetic recording tape was prepared (Specimen No. R-2).

Each of the magnetic recording tapes prepared in Examples 1 to 3 and Reference Example 1 was subjected to tests for durability and also for determination of the coefficient of friction. The results are shown in Table 1.

In general, the tape immediately after production was subjected to test. Exceptionally, the tape prepared in Example 1 (Specimen Nos. 1-1 to 1-11) was subjected to test immediately after production and also after storage at a temperature of 60° C. under a relative humidity of 80% for 30 days.

The durability test was carried out as follows: a signal of 333 Hz was recorded on the tape with a head load of 10 g and a running speed of 4.8 cm/sec at a temperature of 35° C. under a relative humidity of 80%; the recorded signal was reproduced; and the reproduction time until the output of 3 dB below the initial reproduction output was shown was counted.

The coefficient of friction was determined as follows: the tape was run under the same conditions as adopted in the durability test; and after running of 200 times, the dynamic coefficient of friction with the recording head at a relative speed of 4.8 cm/sec was measured.

Besides, for evaluation of the dispersibility of the magnetic layer, some of the tapes obtained in Example 1 (Specimen Nos. 1-1, 1-3, 1-5, 1-7, 1-9 and 1-11) were subjected to a test for determination of the sensitivity (dB) during reproduction of the recorded signal according to the standard set up by the Japanese Association of Magnetic Recording Tape Industry (MTS-102). The results are shown in Table 2.

TABLE 1

| Specimen No. | Tape immediately after production | | Tape after storage for 30 days | |
|---|---|---|---|---|
| | Durability (times) | Coefficient of friction | Durability (times) | Coefficient of friction |
| 1-1 | 1300 | 0.18 | 1280 | 0.18 |
| 1-2 | 1400 | 0.17 | 1300 | 0.18 |
| 1-3 | 1100 | 0.20 | 1100 | 0.20 |
| 1-4 | 1200 | 0.19 | 1150 | 0.20 |
| 1-5 | 1100 | 0.20 | 1070 | 0.20 |
| 1-6 | 1200 | 0.19 | 1100 | 0.20 |
| 1-7 | 1300 | 0.18 | 1300 | 0.18 |
| 1-8 | 1400 | 0.17 | 1350 | 0.18 |
| 1-9 | 600 | 0.25 | 300 | 0.30 |
| 1-10 | 550 | 0.25 | 200 | 0.29 |
| 1-11 | 500 | 0.25 | 500 | 0.25 |
| 2-1 | 1400 | 0.16 | | |
| 2-2 | 1500 | 0.15 | | |
| 2-3 | 1200 | 0.18 | | |
| 2-4 | 1300 | 0.17 | | |
| 2-5 | 1200 | 0.18 | | |
| 2-6 | 1300 | 0.17 | | |
| 2-7 | 1400 | 0.16 | | |
| 2-8 | 1500 | 0.15 | | |
| 2-9 | 700 | 0.25 | | |
| 2-10 | 500 | 0.28 | | |
| 2-11 | 600 | 0.23 | | |
| 3-1 | 1400 | 0.18 | | |
| 3-2 | 1500 | 0.17 | | |
| 3-3 | 1200 | 0.20 | | |
| 3-4 | 1300 | 0.19 | | |
| 3-5 | 1200 | 0.20 | | |
| 3-6 | 1300 | 0.19 | | |
| 3-7 | 1400 | 0.18 | | |
| 3-8 | 1500 | 0.17 | | |
| 3-9 | 700 | 0.25 | | |
| 3-10 | 640 | 0.25 | | |
| 3-11 | 600 | 0.26 | | |
| R-1 | 530 | 0.24 | | |
| R-2 | 210 | 0.30 | | |

TABLE 2

| Specimen No. | Sensitivity (dB) |
|---|---|
| 1-1 | +2.4 |
| 1-3 | +2.1 |
| 1-5 | +2.3 |
| 1-7 | +2.2 |
| 1-9 | +1.8 |
| 1-11 | +1.1 |

From the results in Table 1, it is understood that the magnetic recording tape of the invention has excellent durability and low coefficient of friction. It is also understood that the magnetic recording tape does not show any material increase in the coefficient of friction even after storage at a high temperature under a high humidity for a long period of time and can maintain good lubricity over a long period of time. In comparison of Examples 1, 2 and 3, it may be understood that the use of vinyl chloride resin or nitrocellulose resin as the binder in the magnetic layer can produce particularly excellent durability. From Example 4, it may be understood that when the amount of the silicone compound (I) is less than 0.1% by weight, the improvement of durability and lubricity is not significantly produced.

From the results in Table 2, it is understood that the silicone compound (I) does not afford any material influence on the dispersibility of the magnetic coating composition and can provide a magnetic recording tape having a high sensitivity.

What is claimed is:

1. A magnetic recording medium which comprises a base material and a magnetic layer provided thereon, said magnetic layer comprising magnetic particles and a binder, characterized in that said magnetic layer further comprises at least one silicone compound of the formula:

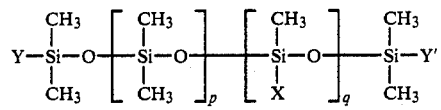

wherein X is the same or different and —A—COOH, —A—OH,

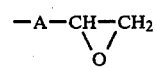

or —A—NH$_2$ in which A is a divalent hydrocarbon group having not more than 26 carbon atoms, Y and Y' are each —X or —CH$_3$, p is an integer of 0 to 1,000 and q is an integer of 1 to 500 but p+q is not more than 1,000.

2. The magnetic recording medium according to claim 1, wherein the amount of the silicone compound is from 0.1 to 10% by weight based on the weight of the magnetic particles in the magnetic layer.

3. The magnetic recording medium according to claim 1, wherein the binder is a vinyl chloride resin or a cellulose resin.

* * * * *